(12) United States Patent
Spurling et al.

(10) Patent No.: US 11,598,293 B2
(45) Date of Patent: Mar. 7, 2023

(54) SYSTEMS FOR AN AIR INTAKE APPARATUS

(71) Applicant: Ford Global Technologies, LLC, Dearborn, MI (US)

(72) Inventors: Michael Spurling, Romford (GB); Marius Sawatzki, Pulheim (DE); Daniel Meckenstock, Wuppertal (DE)

(73) Assignee: Ford Global Technologies, LLC, Dearborn, MI (US)

( * ) Notice: Subject to any disclaimer, the term of this patent is extended or adjusted under 35 U.S.C. 154(b) by 179 days.

(21) Appl. No.: 17/112,715

(22) Filed: Dec. 4, 2020

(65) Prior Publication Data
US 2021/0172408 A1 Jun. 10, 2021

(30) Foreign Application Priority Data
Dec. 5, 2019 (DE) .......................... 102019133115.3

(51) Int. Cl.
*F02M 35/02* (2006.01)
*F02M 35/104* (2006.01)
*F02M 35/04* (2006.01)

(52) U.S. Cl.
CPC ...... *F02M 35/0209* (2013.01); *F02M 35/044* (2013.01); *F02M 35/104* (2013.01)

(58) Field of Classification Search
CPC ............ F02M 35/0209; F02M 35/044; F02M 35/104; F02M 35/048; F02M 35/10209; F02M 35/10288
See application file for complete search history.

(56) References Cited

U.S. PATENT DOCUMENTS

| 3,221,718 | A | | 12/1965 | Isley |
| 4,175,502 | A | | 11/1979 | Moebus |
| 5,472,463 | A | * | 12/1995 | Herman ............ B01D 46/0047 55/497 |
| 6,164,249 | A | | 12/2000 | Honold et al. |
| 7,051,684 | B2 | | 5/2006 | Bauer |
| 2014/0311142 | A1 | * | 10/2014 | Speidel ............... F02B 29/0462 60/599 |
| 2018/0045146 | A1 | * | 2/2018 | Morimoto ............. F02M 26/01 |

FOREIGN PATENT DOCUMENTS

| DE | 3518721 A1 | 11/1986 |
| DE | 102012211060 A1 | 4/2014 |
| DE | 102017210833 A1 | 12/2018 |
| FR | 2913462 A1 * | 9/2008 ......... B01D 46/0004 |
| JP | H0738658 U | 7/1995 |
| JP | 2006336528 A | 12/2006 |
| JP | 2012158994 A | 8/2012 |
| JP | 5272907 B2 | 8/2013 |
| WO | 2014068825 A1 | 5/2014 |

* cited by examiner

*Primary Examiner* — Jacob M Amick
*Assistant Examiner* — Charles J Brauch
(74) *Attorney, Agent, or Firm* — Vincent Mastrogiacomo; McCoy Russell LLP

(57) ABSTRACT

Methods and systems are provided for an air intake apparatus. In one example, a system comprises an air filter box rotatably mounted to an intake manifold. The air filter box rotates about an axis angled to a direction of forward vehicle travel.

19 Claims, 5 Drawing Sheets

SYSTEMS FOR AN AIR INTAKE APPARATUS

CROSS-REFERENCE TO RELATED APPLICATIONS

The present application claims priority to German Patent Application No. 102019133115.3 filed on Dec. 5, 2019. The entire contents of the above-listed application is hereby incorporated by reference for all purposes.

FIELD

The present description relates generally to an air intake apparatus of a reciprocating-piston internal combustion engine which is arranged in a front-end engine compartment of a motor vehicle

BACKGROUND/SUMMARY

A motor vehicle may include a reciprocating-piston internal combustion engine with an intake unit via which, during an intake stroke, fresh air can be drawn in and the drawn-in fresh air can be supplied to combustion chambers of a combustion motor of the reciprocating-piston internal combustion engine. For this purpose, the intake unit may have an intake distributor pipe which is connected in communicating fashion at an inlet side to a throttle flap unit and at an outlet side to intake pipes. The intake pipes may be connected in communicating fashion to the combustion motor. In order to save weight, the intake unit may be produced from a plastic. The reciprocating-piston internal combustion engine may furthermore have a fuel distributor pipe to which fuel is supplied via a fuel pump and which supplies the fuel to fuel injection valves assigned to the combustion chambers. The fuel may be injected via the fuel injection valves into intake lines on a cylinder head of the combustion motor ("port fuel injection", PFI) and/or directly into the combustion chambers (direct injection).

In the case of some motor vehicles, the combustion motor may be arranged within an engine compartment such that a crankshaft of the combustion motor extends in a vehicle transverse direction, commonly referred to as Y direction. Furthermore, the intake unit may be arranged in the engine compartment of a motor vehicle such that the intake distributor pipe likewise extends in the vehicle transverse direction and is arranged at the front side in relation to the combustion motor with respect to a vehicle longitudinal direction, also referred to as X direction. In this case, an exhaust-gas manifold of the reciprocating-piston internal combustion engine may be arranged at the rear side in relation to the combustion motor with respect to the vehicle longitudinal direction. Furthermore, the fuel distributor pipe may be arranged between the intake distributor pipe and the combustion motor.

If, in the case of a frontal deformation event of such a motor vehicle, for example in the event of a frontal deformation or in the event of an oblique frontal collision, an object intervenes at a front side into the engine compartment, the intake distributor pipe may be acted on by a mechanical load arising as a result of contact of the intake distributor pipe with the object or with a vehicle component that has been forced against the intake distributor pipe by the object. As a result, the intake distributor pipe can be degraded and at least partially displaced rearward. Parts of the intake distributor pipe may thus come into contact with the fuel distributor pipe and degrade this and/or displace it rearward. Thus, it may be desired to mitigate this occurrence.

An increase of the stiffness of the entire intake unit or of the entire intake distributor pipe for the purposes of blocking the described deformation may increase a non-compressible dimension of the engine block, formed from the combustion motor and the intake unit, in the vehicle longitudinal direction, whereby the impact event behavior of the motor vehicle, expressed for example by the "vehicle pulse index" (VPI), would be impaired overall, with the result that structural targets possibly may not be attained.

The space for free deformation zones is reduced with every non-deformable or non-compressible component that is added in the vehicle front end. The likelihood of undesired movement increases.

There are various known proposed solutions in the art which use intake manifolds or intake units which are at least partially compressible and/or degradable in the case of a frontal deformation event.

WO 2014/068,825 A1, for example, relates to an intake manifold which allows a controlled action of a force against a fuel system part during a vehicle collision. The intake manifold composed of plastic is equipped with a sleeve-like projection for the fastening of a separate component, wherein the projection is present in the vicinity of an arcuate section of an intake branch pipe section of a second intake branch pipe which is provided separately from a first intake branch pipe. The separate component may for example be formed as an element arranged in the edge region, such as for example a fuel line, a wiring harness, a holder to which the element arranged in the edge region is fastened, wherein the holder is fastened to the sleeve-like projection by means of a bolt or the like. The intake manifold is furthermore equipped with a rib which extends on the edge of the projection along an extent direction of the intake branch pipe section. The rib is provided on the side of the arcuate section and on a side opposite a fuel injection valve and a fuel feed line, such that the sleeve-like projection is arranged between the rib and the fuel injection valve. In the case of a deformation event, the force is such that the intake manifold that is arranged on one side of the cylinder head is pushed upward owing to the situation at the time of the vehicle collision, wherein the intake manifold is, in its entirety, deformed in an upward direction. The flange part of the first inlet branch pipe is firmly fastened to the cylinder head via a bolt, whereas the second inlet branch pipe is deformed in an upward direction, and the second inlet branch pipe slides upward while being pulled off the first inlet branch pipe. Therefore, if the second inlet branch pipe collides with the fuel feed line owing to the behavior at the time of the vehicle deformation, the curved part is intensely deformed and the fuel feed line is subjected to a deformation that is reduced at the lateral edge of the engine. It is consequently possible to block the intake manifold from degrading the fuel injection valve.

Furthermore, JP 5,272,907 B2 discusses ensuring the strength of an intake manifold composed of plastics which is arranged at a front side in front of a transversely installed engine body and ensuring an impact absorption path by desired deformation of the intake manifold if an external load acts proceeding from the front side of the vehicle. The intake manifold is formed by welding of a front side and a rear side of three component bodies. The first component body in the vicinity of the engine body has a high stiffness in a vehicle longitudinal direction in relation to the other component bodies. A curved section of an intake branch line is formed by the second component body and the third component body. The second component body in the middle is equipped with rib structures which, on the curved section, extend in the vehicle longitudinal direction from the front side to the rear side of the intake branch line and the front and rear ends of which become load concentration points if the external load acts proceeding from the vehicle front side.

Furthermore, JP 2012-158,994 A describes a front structure of an engine for a vehicle, which front structure is capable of realizing impact absorption through early deformation of a component body of an intake manifold in the event of a frontal collision, of maintaining the dimensional stability of a main component body of the divided intake manifold in the event of further load introduction, of suppressing a premature degradation of the main component body of the divided intake manifold through the utilization of the mutual dependency of the resin characteristics in the event of local load introduction, and of blocking an impairment with fuel distributing pipes.

The engine front structure is provided for a vehicle which has an engine compartment formed in a front part thereof. The engine front structure comprises: an engine, which is arranged in the interior of the engine compartment with such an orientation that a crankshaft axis extends parallel to a vehicle width direction; an intake manifold composed of plastics, which is arranged in the interior of the engine compartment and which comprises an upper assembly section and a lower assembly section which is provided at a lower position than the upper assembly section, which intake manifold is fastened to a front part of the engine by way of said upper and lower assembly sections; a fuel distributing pipe which is arranged with an orientation which extends in a direction parallel to the crankshaft axis below the upper assembly section in the interior of the engine compartment; and an oil separator cover which is composed of plastics and which is arranged in the interior of the engine compartment and which is provided on the front part of the engine. The intake manifold is formed by a main component body and another component body, wherein the main component body is situated closer to the engine, and the other component body is in one section situated further away from the engine than the main component body, and wherein said component bodies are joined together. The main component body is designed to have a higher strength than the other component body. The upper assembly section and the lower assembly section are provided on the main component body. The main component body and the oil separator cover are equipped with backward movement limiting sections which are each composed of plastic and which abut against one another if the main component body is displaced in the event of a collision of the vehicle.

Furthermore, JP 2006-336,528 A has disclosed an intake apparatus for a combustion motor, which intake apparatus has a middle part of high mechanical strength and has a compensating tank and an intake manifold of lower strength than the middle part, wherein the middle part, the compensating tank and the intake manifold form one component. The middle part is fastened via a flange and a strut to the combustion motor in order to ensure a predefined strength and, in the event of a vehicle accident, to absorb impact energy through the exhaust-gas manifold and the compensating tank. Furthermore, a narrow part is provided on an upper part of the middle part in order to make it easier for the intake apparatus to bend around the combustion motor to the side of the combustion motor, whereby an impact absorption path is lengthened.

JP H07,038,658 U has disclosed an intake manifold with a compensating tank section and with a branch pipe section which is curved and which extends from the compensating tank section to a side surface of the cylinder head. A holding fixing position in the vicinity of a connecting section of the branch pipe section to the cylinder head and the compensating tank section are connected via a support. An intermediate section of the branch pipe section is supported by the vehicle body or by an engine block via a support holder. Furthermore, on the outer surface of the intermediate section of the branch pipe section, there is provided a reinforcing rib which extends in a longitudinal direction of the branch pipe section. The reinforcing rib has a notch between the compensating tank part and the holding fixing position. If the compensating tank section collides with the engine hood owing to the movement of the engine block in the event of a frontal collision, the stress concentration at the notch can lead to a desired fracture, wherein collision energy is absorbed by way of the fracture energy.

Furthermore, DE 10/2017/210,833 A1 describes a reciprocating-piston internal combustion engine for a motor vehicle. The reciprocating-piston internal combustion engine comprises a combustion motor with a crankshaft running in a vehicle transverse direction, comprises a fuel distributor pipe running in the vehicle transverse direction, and comprises an intake unit with an intake distributor pipe running in the vehicle transverse direction. The intake unit furthermore comprises intake channels which are connected in communicating fashion to the intake distributor pipe and to the combustion motor, wherein the intake distributor pipe is arranged at the front or at the rear in relation to the combustion motor with respect to a vehicle longitudinal direction. The fuel distributor pipe is arranged between the intake distributor pipe and the combustion motor. In order to reduce a non-degradable dimension, in the vehicle longitudinal direction, of a section of the reciprocating-piston engine arranged in an engine compartment of a motor vehicle, and at the same time to provide protection for a fuel system of the reciprocating-piston internal combustion engine, a section of the intake unit facing toward the combustion motor has a higher strength and/or stiffness than a section of the intake unit averted from the combustion motor.

In one example, the issues described above may be addressed by a system for an air intake apparatus comprising an intake manifold and an air filter box, wherein the air filter box is mounted to the intake manifold via a rotatable bearing. In this way, an increase amount of deformation space is provided to the air filter box without increasing a packaging size of the air intake apparatus.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 1-9 are drawn to scale, although other relative dimensions may be used.

DETAILED DESCRIPTION

Figure 1:
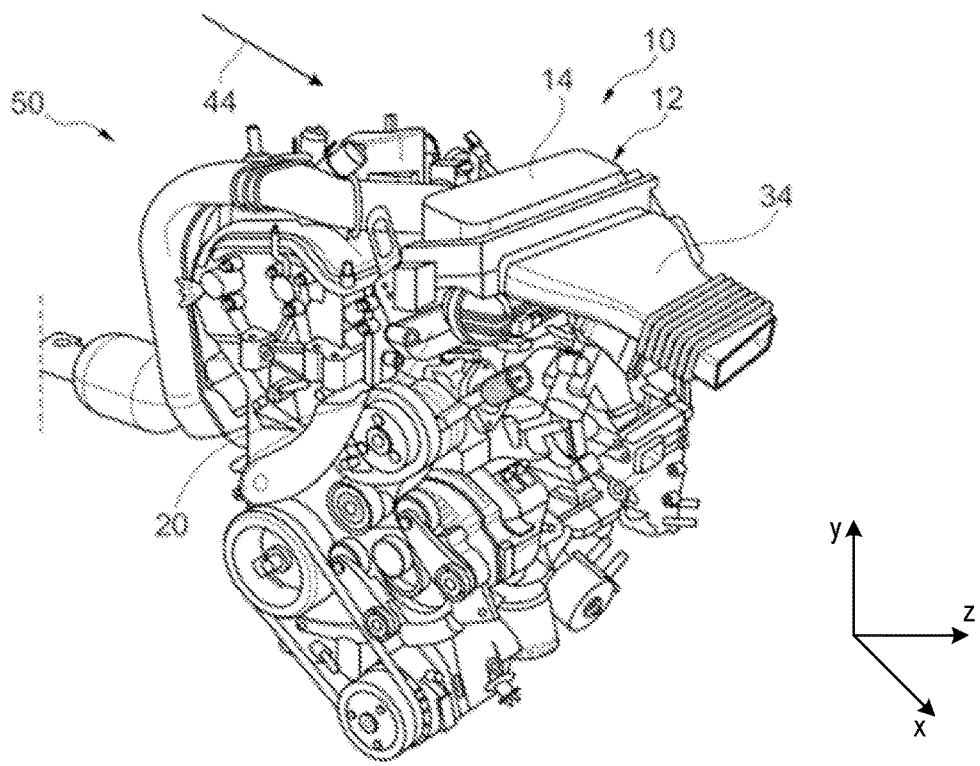
FIG. 1 shows a reciprocating-piston internal combustion engine of a motor vehicle with an air intake apparatus according to the disclosure in an installed state in a schematic, perspective, oblique front view.
Figure 2:
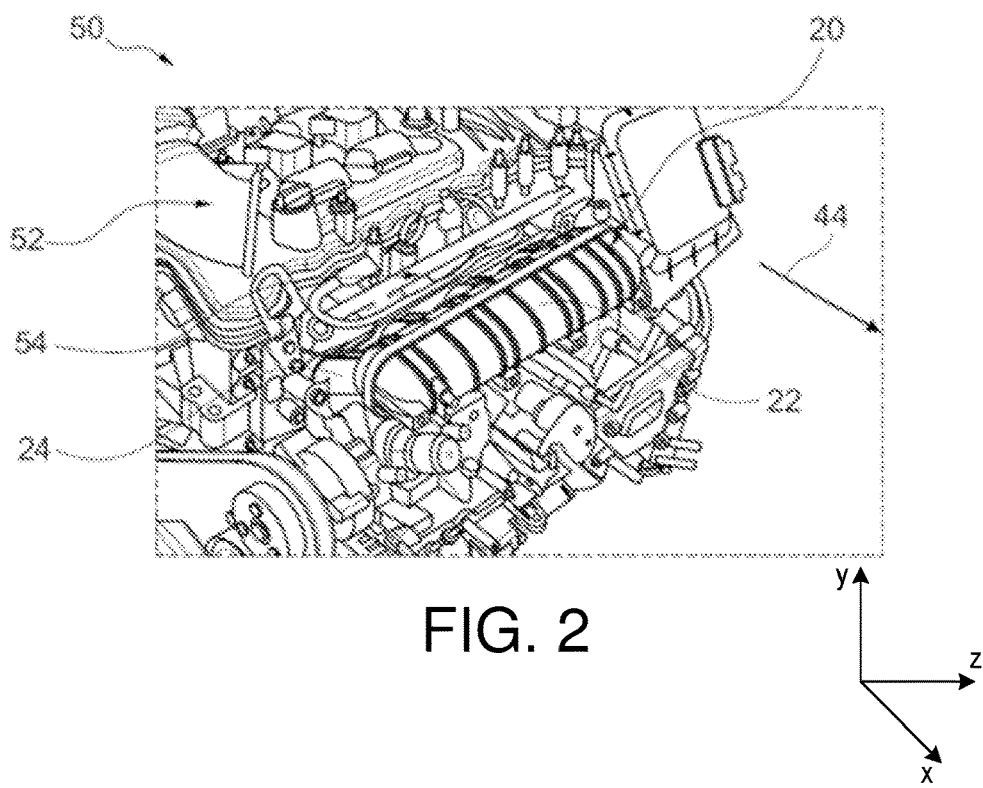
FIG. 2 shows a detail of the reciprocating-piston internal combustion engine as per FIG. 1 with removed air filter box in the same view.
Figure 3A:
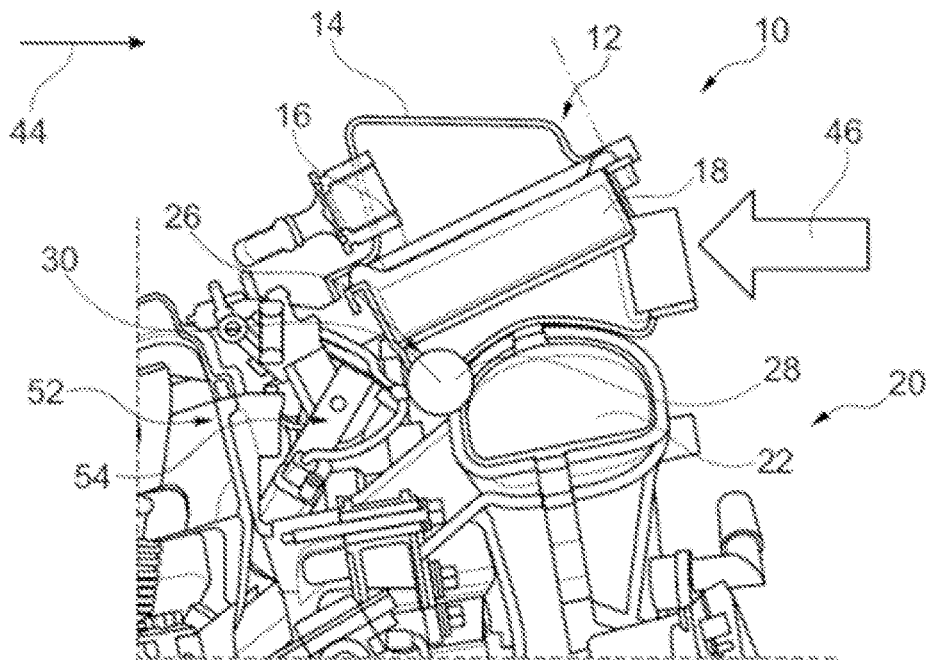
FIGS. 3A and 3B show a schematic illustration of the air intake apparatus as per FIG. 1 in an installed state in a partially sectional side view.
Figure 3B:
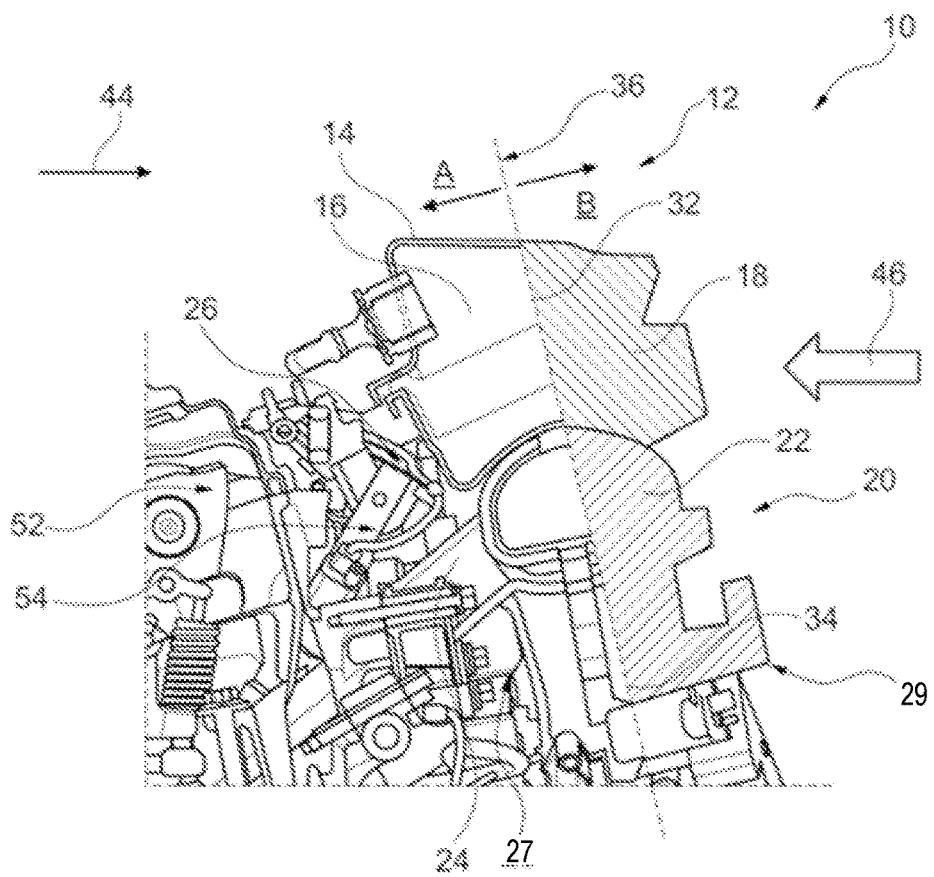
Figure 4:
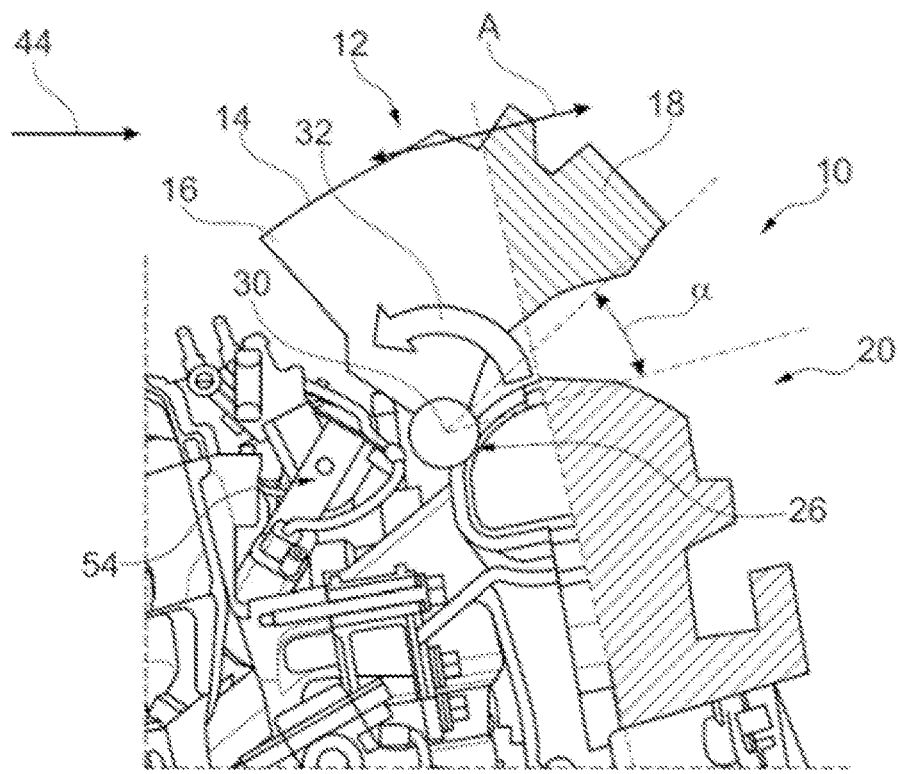
FIG. 4 shows a schematic illustration of the air intake apparatus as per FIG. 1 during a frontal deformation event in a partially sectional side view.
Figure 5:
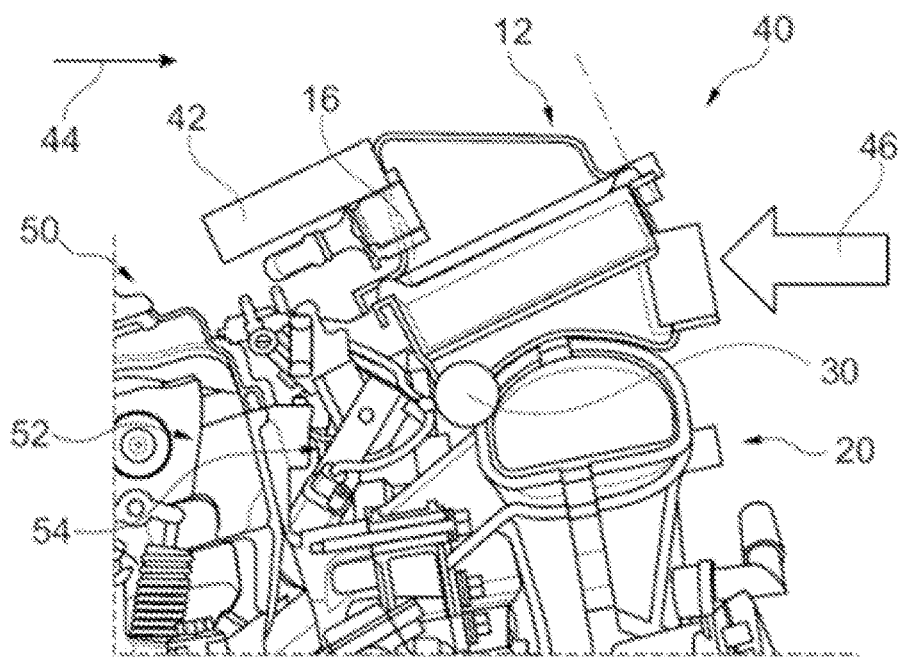
FIG. 5 is a schematic illustration of an alternative embodiment of the air intake apparatus according to the disclosure in an installed state in a partially sectional side view.
Figure 6:
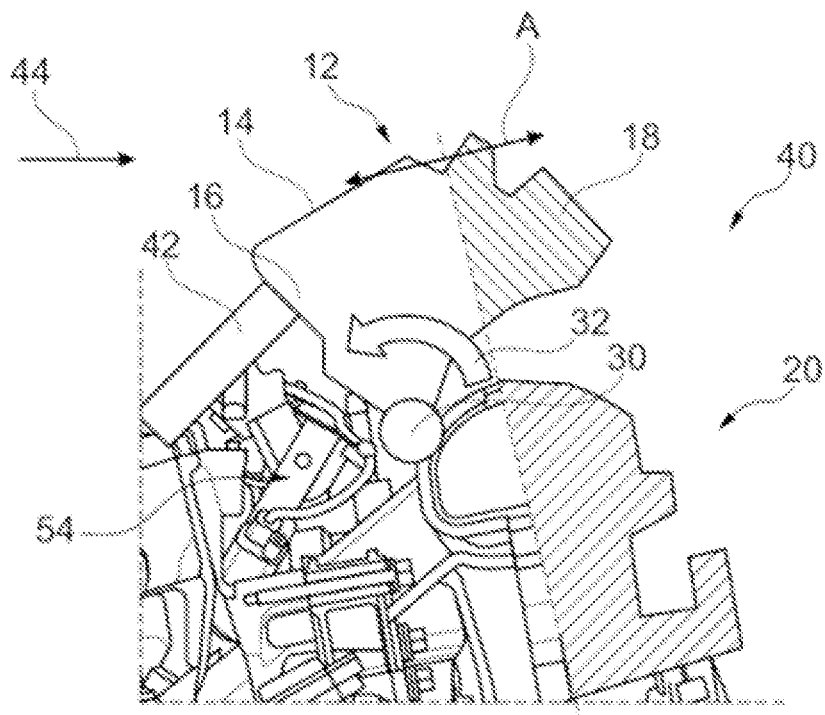
FIG. 6 shows a schematic illustration of the alternative embodiment of the air intake apparatus as per FIG. 5 during a frontal deformation event in a partially sectional side view.
Figure 7:
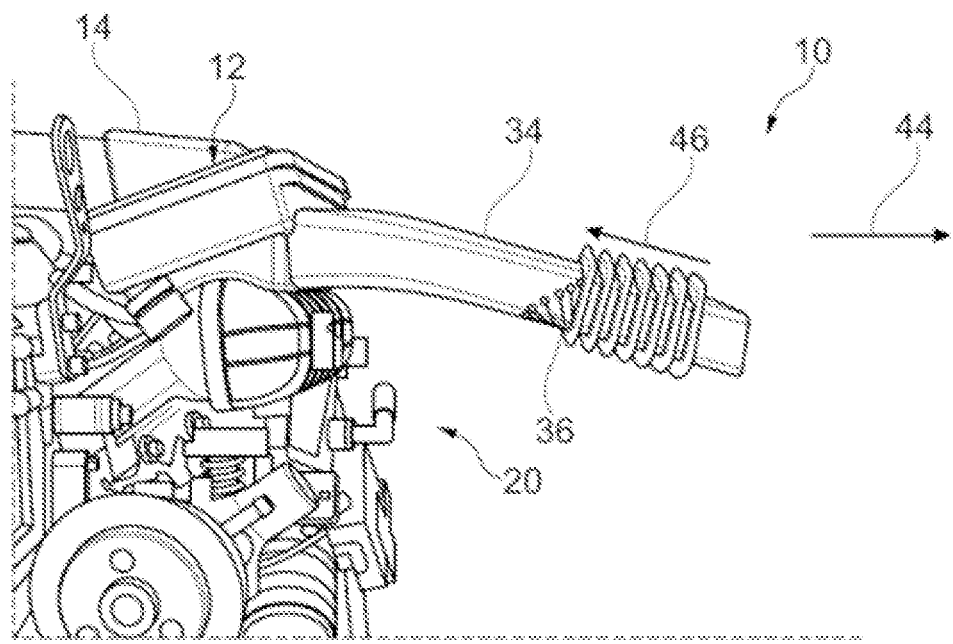
FIG. 7 shows a detail of the air intake apparatus as per FIG. 1 in a side view.
Figure 8:
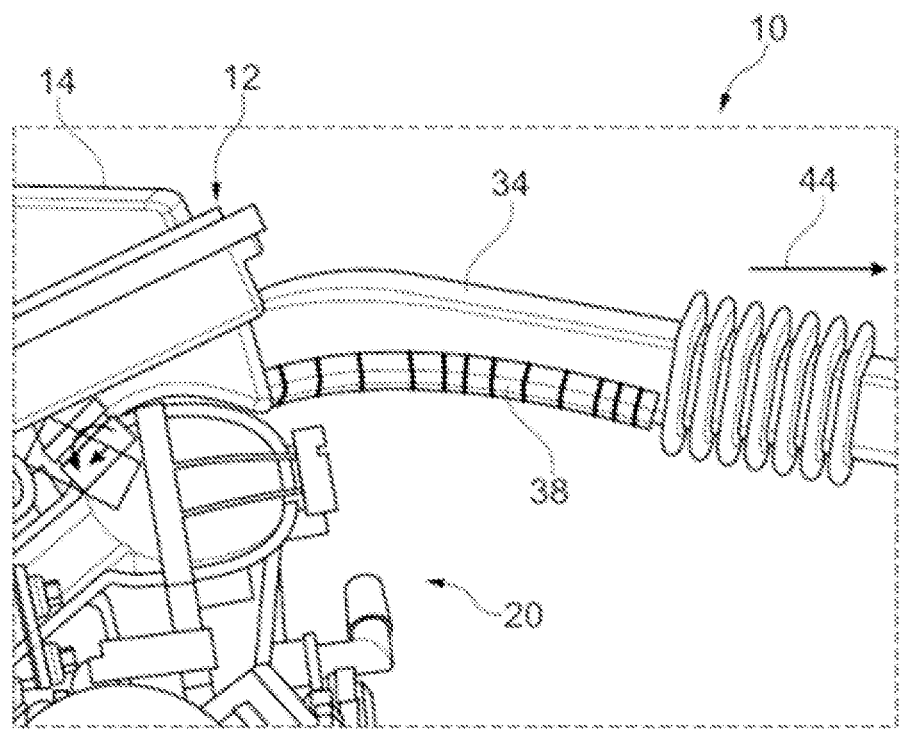
FIG. 8 shows a detail of the air intake apparatus as per FIG. 1 with an alternative embodiment of an intake air channel in a side view.
Figure 9:
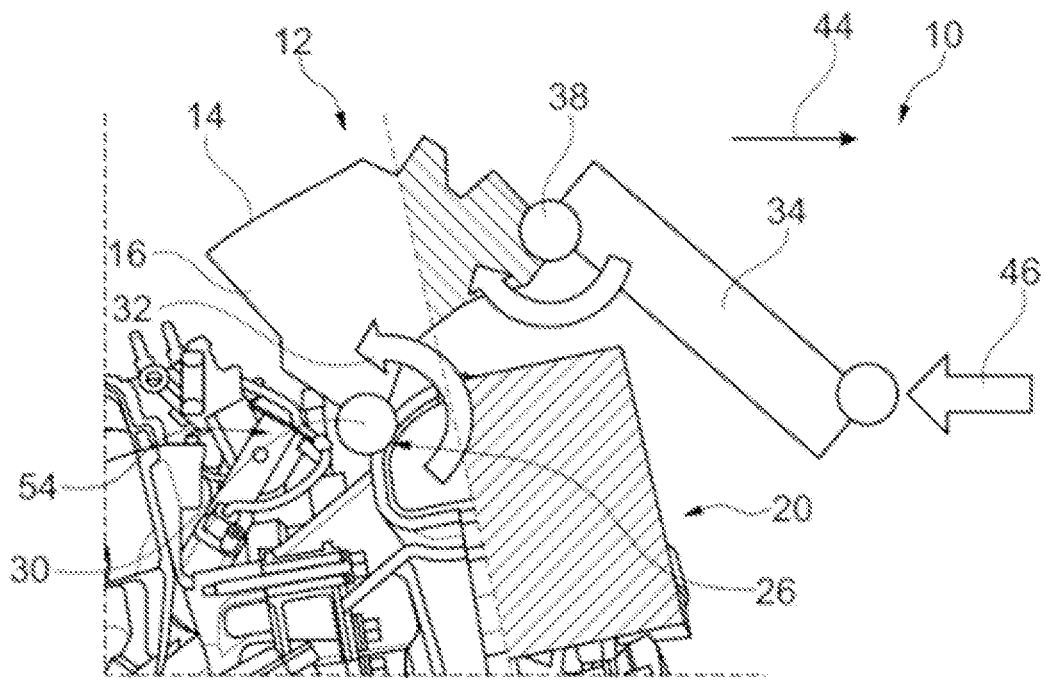
FIG. 9 shows a schematic illustration of the functioning of the air intake apparatus as per FIGS. 7 and 8 in the case of a frontal deformation event.

The following description relates to an air intake apparatus. FIG. 1 shows a reciprocating-piston internal combustion engine of a motor vehicle with an air intake apparatus according to the disclosure in an installed state in a schematic, perspective, oblique front view. FIG. 2 shows a detail of the reciprocating-piston internal combustion engine as per FIG. 1 with removed air filter box in the same view. FIGS. 3A and 3B show a schematic illustration of the air intake apparatus as per FIG. 1 in an installed state in a partially sectional side view. FIG. 4 shows a schematic illustration of the air intake apparatus as per FIG. 1 during a frontal deformation event in a partially sectional side view. FIG. 5 is a schematic illustration of an alternative embodiment of the air intake apparatus according to the disclosure in an installed state in a partially sectional side view. FIG. 6 shows a schematic illustration of the alternative embodiment of the air intake apparatus as per FIG. 5 during a frontal deformation event in a partially sectional side view. FIG. 7 shows a detail of the air intake apparatus as per FIG. 1 in a side view. FIG. 8 shows a detail of the air intake apparatus as per FIG. 1 with an alternative embodiment of an intake air channel in a side view. FIG. 9 shows a schematic illustration of the functioning of the air intake apparatus as per FIGS. 7 and 8 in the case of a frontal deformation event.

The disclosure is based in particular on the object of providing an air intake apparatus of a reciprocating-piston internal combustion engine which is arranged in a front-end engine compartment of a motor vehicle transversely with respect to a direction of straight-ahead travel, which air intake apparatus has an enlarged dimension in the direction of straight-ahead travel which is compressible and/or degradable, that is to say at least partially destructible, in the case of a frontal deformation event and which air intake apparatus provides mechanical protection for other auxiliary components that are operatively connected to the reciprocating-piston internal combustion engine.

It is pointed out that the features and measures specified individually in the following description may be combined with one another in any technically expedient manner and highlight further configurations of the disclosure. The description additionally characterizes and specifies the disclosure in particular in conjunction with the figures.

The air intake apparatus according to the disclosure of a reciprocating-piston internal combustion engine which is arranged in a front-end engine compartment of a motor vehicle transversely with respect to a direction of straight-ahead travel and which has a fuel distributor pipe arranged in front of a cylinder head of the reciprocating-piston internal combustion engine comprises an air filter box and an intake manifold which is arrangeable in front of the fuel distributor pipe and which is provided for producing fluidic connections between the air filter box and combustion chambers of the reciprocating-piston internal combustion engine. Here, the air filter box is, via a joint connection unit, fastened above the intake manifold and to the latter, which joint connection unit, when a horizontally directed force above a predetermined value acts on the air filter box, allows the pivoting movement of said air filter box about an axis of rotation which is arranged substantially horizontally and transversely with respect to the direction of straight-ahead travel.

The expressions "first", "second" etc. used in this application serve only for the purposes of distinction. In particular, the use thereof is not intended to imply a sequence or priority of the objects stated in conjunction with these expressions.

The expression "above" used in this application relates to an installed state of the air intake apparatus. The expressions "in front" and "behind" used in this application, and derived forms thereof, relate to a direction of straight-ahead travel of the motor vehicle. In the context of the disclosure, the expression "provided for" is to be understood in particular to mean specially designed or arranged for that purpose. In the context of this disclosure, "substantially horizontally" is to be understood in particular to mean that the axis of rotation and a horizontal form an angle with a magnitude of less than 20°, less than 15° and particularly less than 10°. The predetermined value of the force is dimensioned such that operationally acting forces remain without influence, but forces that act as a result of a deformation event cause a pivoting movement and/or a compression and/or a degradation, that is to say an at least partial destruction, of components involved. Here, parking dents or the like self-evidently have no effect. The predetermined force is individually adaptable during the production of the motor vehicle. The predetermined force may be assumed to be a load of 10 kN or more, wherein the stated magnitude is self-evidently not intended to be limiting. The loads on the front side of the engine are however higher than the stated magnitude of 10 kN. It can thus be ensured that, in the event of a frontal deformation, dynamic compaction of the components involved occurs, which involves a rotation of the air intake apparatus. The magnitude of 10 kN or higher lies above the limit value that allows robust characteristics of the components during normal operation. This is based on the recognition that the energy dissipation by degraded components is higher the higher the load level of the components being compacted is.

Via the proposed air intake apparatus, the desired arrangement of the air filter box on the intake manifold, via which guidance of the air intake path around the engine can be enhanced and space for additional components can be created in the engine compartment, can be made operationally desirable even for the case of a frontal deformation event, because the air filter box does not perform any translational movement in the direction of the fuel distributor pipe. The energy advantageously pivots the air filter box rearward, whereby a dimension of the air filter box in the direction of straight-ahead travel can be reduced.

The allowance of the pivoting movement of the air filter box about the axis of rotation may be effected for example via a detent mechanism, a predetermined breaking point or any other suitable means.

In one example, the intake manifold is produced predominantly from a plastics material. In the context of the disclosure, the expression "predominantly" is to be understood in particular to mean a fraction of more than 50 vol. %, more than 70 vol. % and particularly of more than 90 vol. %. In particular, the expression is intended to include the possibility that the entirety, that is to say 100 vol. %, of the intake manifold is composed of the plastics material.

In some embodiments of the air intake apparatus, additionally or alternatively, the joint connection unit is in the form of a rotary joint connection, whereby additional stability parallel to a direction of the pivot axis can be attained.

In some examples, additionally or alternatively, the air filter box is fastened to a part of the intake manifold which is of mechanically reinforced form in relation to the remaining part. In this way, a pivoting movement of the air filter box in the case of a frontal deformation event can be promoted even in the event of partial compression, that is to say at least partial degradation, of the intake manifold.

In some embodiments of the air intake apparatus, additionally or alternatively, the air filter box has a housing with a housing part which faces toward the fuel distributor pipe in an installed state and with a housing part which is averted from the fuel distributor pipe in an installed state. Here, that housing part which faces toward the fuel distributor pipe is of mechanically reinforced form in relation to that housing part which is averted from the fuel distributor pipe. In this way, that housing part of the air filter box which is averted from the fuel distributor pipe can be compressed, that is to say at least partially degraded, in the case of a deformation event, whereby impact energy can be kept away from the fuel distributor pipe.

The air intake apparatus may have at least one stop element which is provided for limiting the pivoting movement of the air filter box about the axis of rotation. In this way, it can be ensured that, in the case of a deformation event, the air filter box introduces no additional force resulting from the impact, or only a small proportion of said force, into the fuel distributor pipe. In the case that the air filter box has a mechanically reinforced housing part facing toward the fuel distributor pipe, the stop element may be configured such that a housing part of the air filter box averted from the fuel distributor pipe is compressed in the case of a frontal deformation event before a strength limit of the at least one stop element is exceeded. In this way, impact energy can be kept away from the fuel distributor pipe, and furthermore the fuel distributor pipe can be mechanically protected by the mechanically reinforced housing part which faces toward the fuel distributor pipe.

In some examples, additionally or alternatively, the at least one stop element is arranged within the joint connection unit. In this way, the pivoting movement of the air filter box about the axis of rotation triggered by a frontal deformation event can be limited in a structurally particularly compact manner.

In some embodiments of the air intake apparatus, additionally or alternatively, at least one stop element is attached to a housing part, which faces toward the fuel distributor pipe in an installed state, of the air filter box so as to extend rearward and is provided for producing a force introduction path between the air filter box and the cylinder head of the reciprocating-piston internal combustion engine when the horizontally directed force above the predetermined value acts on the air filter box.

In the context of the disclosure, a "force introduction path" is to be understood in particular to mean a force introduction path which amounts to a proportion of more than 50%, more than 70% and particularly more than 80% of the force acting on the air filter box owing to the deformation event.

In the case of a suitable design of the stop element, the additional force on the air filter box resulting from the impact can be transmitted with a particularly low contact pressure to the cylinder head of the reciprocating-piston internal combustion engine and kept away from the fuel distributor pipe, whereby demands with regard to the strength of the stop element can be reduced.

In some examples, additionally or alternatively, a pivoting range of the joint connection unit between a starting position in the installed state and an end position of the pivoting movement limited by the stop element has a pivot angle which amounts to between 20° and 50°. With such a pivot angle range, a dimension of the air filter box in the direction of straight-ahead travel can, in the case of a frontal deformation event, be reduced to an extent sufficient for a majority of possible applications.

In some embodiments of the air intake apparatus, additionally or alternatively, the air filter box has an intake air channel which is fluidically connected to the housing and which, in the installed state, extends from the housing in the straight-ahead forward direction and which comprises a downwardly pointing coherent section which has a lower mechanical strength than the remaining part of the intake air channel. This offers the advantage that, in the case of a frontal deformation event, via the intake air channel which is arranged in front of the air filter box in the straight-ahead forward direction, a pivoting movement of the air filter box can be initiated at an earlier point in time as a result of an overshooting of the predetermined value for the horizontally directed force.

In some examples, additionally or alternatively, the downwardly pointing coherent section is arranged on an end region averted from the housing, or on an end region, connected to the housing, of the intake air channel. In this way, in the case of a frontal deformation event, a force or a torque in relation to the axis of rotation can be applied to the air filter box in a particularly effective manner, and the pivoting movement thereof about the axis of rotation can be implemented in a particularly reliable manner.

In a further example of the disclosure, additionally or alternatively, a reciprocating-piston internal combustion engine of a motor vehicle is proposed, which reciprocating-piston internal combustion engine is arranged in a front-end engine compartment of the motor vehicle transversely with respect to a direction of straight-ahead travel and has a fuel distributor pipe arranged in front of a cylinder head of the reciprocating-piston internal combustion engine. Here, the reciprocating-piston internal combustion engine is equipped with one possible embodiment of the air intake apparatus according to the disclosure, and the intake manifold of the air intake apparatus is arranged in front of the fuel distributor pipe.

The advantages described in conjunction with the proposed air intake apparatus are applicable in full to the reciprocating-piston internal combustion engine. In the context of this disclosure, a "motor vehicle" is to be understood in particular to mean a passenger motor vehicle, a heavy goods vehicle, a semitrailer tractor or a motor bus.

In some examples, additionally or alternatively, via the proposed air intake apparatus, the advantageous arrangement of the air filter box on the intake manifold, via which guidance of the air intake path around the engine can be enhanced and space for additional components can be created in the engine compartment, can be made operationally desirable even for the case of a frontal deformation event, because that housing part of the air filter box which faces toward the fuel distributor pipe and the first structural pipe of the intake manifold are, in the case of a deformation event, of higher mechanical strength than that housing part of the air filter box, which is averted from the fuel distributor pipe, and the second structural part of the intake manifold, respectively.

By contrast, that housing part of the air filter box which is averted from the fuel distributor pipe and the second structural part of the intake manifold can be at least partially compressed, that is to say at least partially destroyed, in the case of a deformation event, whereby impact energy is converted into deformation energy and can be kept away from the fuel distributor pipe. Here, via that housing part of the air filter box which faces toward the fuel distributor pipe and via the first structural part of the intake manifold, the fuel distributor pipe can be protected in an effective manner against damage by fragments of that housing part of the air filter box which is averted from the fuel distributor pipe and fragments of the second structural part of the intake manifold.

In some embodiments, additionally or alternatively, that fraction of a volume enclosed by the overall housing which is enclosed by the flexible housing part averted from the fuel distributor pipe in the installed state amounts to between 25% and 75%. In this range, depending on the specific application, it is possible to find an advantageous compromise between an enlarged dimension in the straight-ahead direction of travel which is compressible and/or degradable, that is to say at least partially deformable, in the case of a frontal deformation event and mechanical protection of the fuel distributor pipe.

In some embodiments of the air intake apparatus, additionally or alternatively, the air filter box is fastened to the first structural part of the intake manifold. The first structural part of the intake manifold is of mechanically reinforced form in relation to the second structural part. In the case of a frontal deformation event, protection of the fuel distributor pipe by that housing part of the air filter box which faces toward the fuel distributor pipe in the installed state can be reliably ensured even in the case of partial compression and/or degradation of the intake manifold.

The first structural part of the intake manifold comprises a multiplicity of intake pipes for producing the fluidic connections between the air filter box and combustion chambers of the reciprocating-piston internal combustion engine, wherein the intake pipes each have a reinforcement structure in the form of a multiplicity of rib-like material thickenings which run parallel to one another and parallel to an extent direction of the respective intake pipe. In the context of the disclosure, the expression "multiplicity" is to be understood in particular to mean a number of at least two. In this way, higher mechanical strength of the first structural part of the intake manifold, in particular increased flexural strength thereof transversely with respect to the extent direction of the respective intake pipe, in relation to the second structural part can be attained in a structurally simple manner.

In some embodiments, additionally or alternatively, the housing of the air filter box is arrangeable relative to the intake manifold such that an imaginary boundary line between the housing part facing toward the fuel distributor pipe in the installed state and the housing part averted from the fuel distributor pipe in the installed state and an imaginary boundary line between the first structural part and the second structural part of the intake manifold lie substantially in a common plane. In this way, from the second structural part of the intake manifold and that housing part of the air filter box which is averted from the fuel distributor pipe in the installed state, a spatial region can be formed which has an enlarged dimension in the direction of straight-ahead travel which is compressible and/or degradable, that is to say at least partially destructible, in the case of a frontal deformation event, wherein, owing to the at least partial compression and/or degradation, impact energy can be converted into deformation energy and kept away from the fuel distributor pipe.

In some embodiments, additionally or alternatively, the common plane is arranged substantially perpendicular to a straight-ahead forward direction of the motor vehicle. In this way, an optimum alignment of the enlarged compressible and/or degradable dimension in the straight-ahead direction of travel for the case of a frontal deformation event can be attained.

In some embodiments, additionally or alternatively, the housing of the air filter box has a predominant proportion of a plastics material. The expression "a predominant part" is to be understood in the context of the disclosure in particular to mean a fraction of more than 50 vol. %, more than 70 vol. % and particularly more than 90 vol. %. In particular, the expression is intended to include the possibility that the entirety, that is to say 100 vol. %, of the housing of the air filter box is composed of the plastics material. Aside from the weight saving, this yields the advantage that the housing parts of the housing facing and averted from the fuel distributor pipe in the installed state can be produced with different mechanical strengths in a particularly simple manner.

In some embodiments, additionally or alternatively, the mechanically reinforced form of that housing part of the air filter box which faces toward the fuel distributor pipe in the installed state is produced via a fiber reinforcement. In this way, that housing part of the air filter box which faces toward the fuel distributor pipe in the installed state can be formed with an equal or similar material thickness to, and so as to be mechanically reinforced in relation to, the housing part averted from the fuel distributor pipe. The fiber reinforcement may comprise for example carbon fibers, glass fibers, aramid fibers or any combination of these fibers.

In some embodiments of the air intake apparatus, additionally or alternatively, that housing part of the air filter box which is averted from the fuel distributor pipe in the installed state is adapted in terms of its mechanical strength to the mechanical strength of the second structural part of the intake manifold. In this way, the spatial region which is formed from the second structural part of the intake manifold and that housing part of the air filter box which is averted from the fuel distributor pipe in the installed state, and which constitutes an enlarged dimension in the direction of straight-ahead travel which is compressible and/or degradable, that is to say at least partially deformable, in the case of a frontal deformation event, can be provided with a uniform strength. In this way, for the case of a frontal deformation event, it is possible to attain uniform deformation or degradation of the component parts arranged in the spatial region.

In a further aspect of the disclosure, a reciprocating-piston internal combustion engine of a motor vehicle is proposed, which reciprocating-piston internal combustion engine is arranged in a front-end engine compartment of the motor vehicle transversely with respect to a direction of straight-ahead travel and has a fuel distributor pipe arranged in front of a cylinder head of the reciprocating-piston internal combustion engine. Here, the reciprocating-piston internal combustion engine is equipped with one possible embodiment of the air intake apparatus according to the disclosure, and the intake manifold of the air intake apparatus is arranged in front of the fuel distributor pipe.

The advantages described in conjunction with the proposed air intake apparatus are applicable in full to the reciprocating-piston internal combustion engine. In the context of this disclosure, a "motor vehicle" is to be understood in particular to mean a passenger motor vehicle, a heavy goods vehicle, a semitrailer tractor or a motor bus.

FIGS. 1-9 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

In the various figures, identical parts are denoted by the same reference designations, for which reason these will generally also be described only once.

FIGS. 1 and 2 show a reciprocating-piston internal combustion engine 50 of a motor vehicle with one possible embodiment of the air intake apparatus 10 according to the disclosure in an installed state in a schematic, perspective, oblique front view. The reciprocating-piston internal combustion engine 50 is arranged in a front-end engine compartment of the motor vehicle transversely with respect to a direction of straight-ahead travel 44, which is parallel to an x-axis.

The air intake apparatus 10 may comprise an air filter box 12 with a housing 14 and with an air filter accommodated in the housing 14. The air intake apparatus 10 may further comprise an intake manifold 20. The intake manifold 20 may comprise a compensating tank 22 and a multiplicity of intake pipes 24 (FIG. 2), which branch off from one side of the compensating tank 22 and produce fluidic connections between the air filter box 12 and combustion chambers of the reciprocating-piston internal combustion engine 50. The intake manifold 20, which may be produced for example from a plastics material, may be fixedly screwed to a cylinder head 52 of the reciprocating-piston internal combustion engine 50.

The reciprocating-piston internal combustion engine 50 may comprise a fuel distributor pipe 54 which is arranged in front of the cylinder head 52 of the reciprocating-piston internal combustion engine 50 in relation to the direction of straight-ahead travel 44. The fuel distributor pipe 54 is illustrated in FIG. 2, which shows a detail of the reciprocating-piston internal combustion engine 50 as per FIG. 1 with the air filter box 12 removed. The fuel distributor pipe 54 may for example be part of a "port fuel injection" (PFI) system in which fuel is injected by means of fuel injection valves into intake lines, which are arranged on the cylinder head 52, of the reciprocating-piston internal combustion engine 50.

The fuel distributor pipe 54 is situated between the intake manifold 20 and the cylinder head 52, such that the intake manifold 20 is arranged in front of the fuel distributor pipe 54 in relation to the direction of straight-ahead travel 44 of the motor vehicle. The fuel distributor pipe 54 is fastened to the intake pipes 24 of the intake manifold 20.

FIG. 3A is a schematic illustration of the air intake apparatus 10 as per FIG. 1 in an installed state, before a frontal deformation event, in a partially sectional side view and without an intake air channel 34, which can be seen in FIGS. 7 and 8, fluidically connected to the air filter box 12.

The air filter box 12 may be, via a joint connection unit 26, fastened above the intake manifold 20 and to the latter. A part of the intake manifold 20 which is arranged at the rear and to which the air filter box 12 is fastened is of mechanically reinforced form in relation to the remaining part of the intake manifold 20. The mechanical reinforcement may be produced for example via an enlarged material thickness, via reinforcement structures such as ribs, or via additional substances in a plastics material, for example via the addition of fibers.

The housing 14 of the air filter box 12 may include a housing part 16 which faces toward the fuel distributor pipe 54 in an installed state and has a housing part 18 which is averted from the fuel distributor pipe 54 in the installed state. Herein, the housing part 16 is referred to as a first housing part 16 and the housing part 18 is referred to as a second housing part 18. The first housing part 16 which faces toward the fuel distributor pipe 54 may be of mechanically reinforced form in relation to the second housing part 18 which is averted from the fuel distributor pipe 54. The mechanical reinforcement may be produced in a similar manner to that described for the intake manifold 20.

The joint connection unit 26 comprises a joint 28, which may for example be in the form of a rotary joint. The joint connection unit 26, when a horizontally directed force 46 above a predetermined value acts on the air filter box 12, allows the pivoting movement 32 (FIG. 4) of said air filter box about an axis of rotation 30 which is arranged substantially horizontally and transversely with respect to the direction of straight-ahead travel 44. In one example, the axis of rotation 30 is parallel to the y-axis.

The pivoting movement 32 of the air filter box 12 about the axis of rotation 30 may be provided via a bolt which, in an installed state, blocks a relative movement of parts of the joint 28 and which constitutes a predetermined degradation point via which the relative movement of the parts of the joint 28 is enabled when the bolt degraded (e.g., splits and/or cracks) when a predetermined value of a force acting on the joint connection unit 26 is reached. The pivoting movement 32 of the air filter box 12 may be provided via other elements, for example by a detent element. It is also possible in principle for other means that appear suitable to a person skilled in the art to be used to allow the pivoting movement 32 of the air filter box 12 when a predetermined value of a force acting on the joint connection unit 26 is reached.

Turning to FIG. 3B, it shows an additional example of the intake apparatus 10. The multiplicity of intake pipes 24 and a part of the compensating tank 22 facing toward the cylinder head 52 form a coherent first structural part 27 of the intake manifold 20. A part of the compensating tank 22 averted from the cylinder head 52 forms a coherent second structural part 29 of the intake manifold 20. The first structural part 27 of the intake manifold 20 has a higher mechanical strength than the second structural part 29.

This higher mechanical strength may be produced in a plurality of ways as will be described herein. The intake pipes 24 may each have a reinforcement structure formed as a multiplicity of rib-like material thickenings which run parallel to one another and parallel to an extent direction of the respective intake pipe 24. The first structural part 27 of the intake manifold 20 may have a greater material thickness than the second structural part 29. The material of the first structural part 27 of the intake manifold 20 may, by contrast to the material of the second structural part 29, be equipped with materials for mechanical reinforcement, for example with fiber materials. The housing 14 of the air filter box 12 has a predominant proportion of a plastics material, which may be formed from a thermoplastic. The housing 14 comprises the first housing part 16 facing toward the fuel distributor pipe 54 in an installed state and the second housing part 18 averted from the fuel distributor pipe 54 in the installed state. The first housing part 16 facing toward the fuel distributor pipe 54 is of mechanically reinforced form in relation to the second housing part 18 averted from the fuel distributor pipe 54. The mechanically reinforced form of the first housing part 16 may be produced for example by virtue of short fibers, for example glass fibers, being admixed to the thermoplastic during the production of the first housing part 16 facing toward the fuel distributor pipe 54 in the installed state, which may be performed for example by way of an injection molding process, despite which fibers an injection molding capability remains unaffected.

The first housing part 16 facing toward the fuel distributor pipe 54 is adapted in terms of its mechanical strength to the mechanical strength of the first structural part 27 of the intake manifold 20. The air filter box 12 is fastened to the first structural part 27 of the intake manifold 20 by way of the housing part first 16 facing toward the fuel distributor pipe 54 in the installed state.

The second housing part 18, averted from the fuel distributor pipe 54 in the installed state, may be adapted in terms of its mechanical strength to the mechanical strength of the second structural part 29 of the intake manifold 20.

That fraction of a volume enclosed by the housing 14 which is enclosed by the second housing part 18 averted from the fuel distributor pipe 54 in the installed state amounts to between 25% and 75%. In one example, volume enclosed by the second housing part 18 may be equal to 45%.

As can be seen from FIG. 3B, the housing 14 of the air filter box 12 is arranged relative to the intake manifold 20 such that an imaginary boundary line 32 between the first housing part 16 facing toward the fuel distributor pipe 54 in the installed state and the second housing part 18 averted from the fuel distributor pipe 54 in the installed state and an imaginary boundary line 34 between the first structural part 27 and the second structural part 29 of the intake manifold 20 lies substantially in a common plane 36. The common plane 36 is, in the present embodiment, tilted rearward by an angle of approximately 13° and is thus arranged closer to perpendicular than parallel relative to the straight-ahead forward direction 44 of the motor vehicle.

The plane 36 may divide the installation space of the engine compartment in which the air filter box 12, the intake manifold 20 and the fuel distributor pipe 54 in front of the cylinder head 52 are arranged into a partial space A arranged behind the plane 36 and a partial space B arranged in front of the plane 36. The partial space A arranged behind the plane 36 contains the first housing part 16 of the air filter box 12 which faces toward the fuel distributor pipe 54 in the installed state and the first structural part 27 of the intake manifold 20. The partial space B arranged in front of the plane 36 comprises the second housing part 18 of the air filter box 12 which is averted from the fuel distributor pipe 54 in the installed state and the second structural part 29 of the intake manifold 20.

The partial space B arranged in front of the plane 36 constitutes, in the direction of straight-ahead travel 44, an enlarged dimension with a component part which is compressible and/or degradable, that is to say at least partially deformable, in the case of a frontal deformation event owing to a force 46 caused by the impact, wherein the component parts are, owing to the adapted mechanical strength, deformed, that is to say degraded, uniformly in the case of a frontal deformation event. By contrast, the partial space A arranged behind the plane 36 contains mechanically reinforced component parts which, in the case of a frontal deformation event, provide adequate holding strength and effective mechanical protection for the fuel distributor pipe 54.

FIG. 4 shows a schematic illustration of the air intake apparatus 10 as per FIG. 1 during a frontal deformation event in a partially sectional side view. A horizontally directed force 46 (FIGS. 3A and 3B) on the air filter box 12 caused as a result of the frontal deformation event exceeds the predetermined value, whereby the relative movement of the parts of the joint 28 of the joint connection unit 26 is enabled. Owing to the force 46 that is caused, or the torque that is caused in relation to the axis of rotation 30, the air filter box 12 performs a pivoting movement 32 about the axis of rotation 30 (FIG. 4), wherein that housing part 18 of the housing 14 which is averted from the fuel distributor pipe 54 is pivoted upward. It is to be noted that the air filter box 12 does not perform a translational movement in the direction of the fuel distributor pipe 54.

The joint connection unit 26 of the air intake apparatus 10 is equipped with a stop element which is arranged within the joint connection unit 26. The stop element may for example be in the form of a bolt which, at the end of the pivoting movement 32, at a predetermined pivot angle, blocks a relative movement of parts of the joint 28. The stop element is provided for limiting the pivoting movement 32 of the air filter box 12 about the axis of rotation 30 to a predetermined pivoting range. The predetermined pivoting range of the joint connection unit 26 between a starting position in the installed state and a position of the pivoting movement 32 limited by the stop element has a pivot angle α which, for the present exemplary embodiment, is approximately 27° and which may generally lie between 20° and 50°.

In that position of the pivoting movement 32 limited by the stop element which is illustrated in FIG. 4, the air filter box 12 does not exert on the fuel distributor pipe 54 any additional force resulting from the impact. The first housing part 16 of the housing 14 of the air filter box 12 which faces toward the fuel distributor pipe 54 rather serves as mechanical protection for the fuel distributor pipe 54, whereas the second housing part 18 of the housing 14 of the air filter box 12 which is averted from the fuel distributor pipe 54 is compressed or degraded, that is to say at least partially deformed, by the impact energy, whereby the impact energy is advantageously converted into deformation energy.

As can be seen from FIG. 4, the second housing part 18 of the housing 14 of the air filter box 12 which is averted from the fuel distributor pipe 54 and a part, averted from the fuel distributor pipe 54, of the intake manifold 20 form a compressible or degradable, that is to say at least partially deformable, region A of the air intake apparatus 10, whereby a dimension of the air intake apparatus 10 in the direction of straight-ahead travel 44 can be reduced in the case of a frontal deformation event.

In this way, FIGS. 3A, 3B, and 4 illustrate an embodiment of an air intake apparatus comprising an air filter box mounted to a structurally rigid portion of an intake manifold. In response to a force exceeding a threshold force in a direction opposite vehicle travel, the mounting between the air filter box and the intake manifold may allow the air filter box to rotate about an axis angled to a direction of the force. In this way, an amount of space in which the air filter box may travel prior to contacting a fuel rail or other component may be increased without increasing a packaging size of the intake apparatus. Each of the air filter box and the intake manifold may comprise portions that are configured to give in response to the force exceeding the threshold force. That is to say, the air filter box and the intake manifold may comprise a structurally rigid portion and a structurally deformable portion, wherein the structurally rigid portion is more resistant to deforming in response to the force relative to the structurally deformable portion. By doing this, the amount of space may be further increased.

FIG. 5 shows a schematic illustration of an alternative embodiment of the air intake apparatus 40 according to the disclosure in an installed state in a partially sectional side view. FIG. 6 shows a schematic illustration of the alternative embodiment of the air intake apparatus 40 as per FIG. 5 during a frontal deformation event in the same view.

To avoid repetitions, only differences of the alternative embodiment in relation to the embodiment of the air intake apparatus 10 as per FIGS. 3A, 3B, and 4 will be described below.

The air intake apparatus 40 as per FIGS. 5 and 6 has a stop element 42 of cuboidal shape, which stop element is attached to the first housing part 16, which faces toward the fuel distributor pipe 54 in an installed state, of the air filter box 12 in an upper region so as to extend rearward and is provided for producing a force introduction path between the air filter box 12 and the cylinder head 52 of the reciprocating-piston internal combustion engine 50 when the horizontally directed force 46 above the predetermined value acts on the air filter box 12. This state is illustrated in FIG. 6. The stop element 42 is produced from the same material as the air filter box 12, for example from a thermoplastic plastics material, and may be formed integrally on the air filter box 12. On the cylinder head 52 of the reciprocating-piston internal combustion engine 50, a region in which the stop element 42 comes into mechanical contact with the cylinder head 52 in the case of a deformation event may be shaped for an optimized, that is to say substantially perpendicularly acting, introduction of force and kept substantially free from relevant auxiliary components of the reciprocating-piston internal combustion engine 50.

In one example, the stop element may be integrally arranged in the mounting between the air filter box and the intake manifold. The stop element may operate in conjunction with the rotatable bearing such that the stop element limits an amount of rotation of the air filter box. In one example, the stop element may stop the air filter box from rotating between 30 to 40 degrees relative to the y-axis. However, it will be appreciated that the stop element may limit the rotation of the air filter box based on a position of the fuel rail. Additionally or alternatively, upon contacting the stop element, the air filter box may function as a shield and block debris and other components from contacting the fuel rail following completion of its rotation. In one example, the stop element may stop the rotation of the air filter box by contacting an engine head or other component of the vehicle.

FIG. 7 shows a detail of the air intake apparatus 10 as per FIG. 1 in a side view in a variant in which the air filter box 12 has an intake air channel 34 fluidically connected to the housing 14. The intake air channel 34 extends, in the installed state, from the housing 14 in the straight-ahead forward direction 44, wherein the rectangular cross-sectional area adapted to an opening of the air filter box 12 narrows in the straight-ahead forward direction 44 (illustrated in FIG. 1), and said intake air channel comprises a downwardly pointing coherent section 36 (FIG. 7) which has a lower mechanical strength than the remaining part of the intake air channel 34. The lower mechanical strength may be produced for example via a reduced material thickness in the coherent section or via an increased material thickness, reinforcement structures such as ribs or via reinforcing additional substances, for example via the addition of fibers, in the material of the remaining part of the intake air channel 34.

FIG. 7 illustrates an embodiment of the intake air channel 34 in which the downwardly pointing coherent section 36 with a relatively low mechanical strength is arranged on an end region, averted from the housing 14, of the intake air channel 34. In one example, the intake air channel 34 is coupled to the second housing part 18.

FIG. 8 illustrates an alternative embodiment of the intake air channel 34, in which a downwardly pointing coherent section 38 with the relatively low mechanical strength is arranged on an end region, connected to the housing 14 of the air filter box 12, of the intake air channel 34.

In this way, FIGS. 7 and 8 illustrate an example of an intake air channel coupled to the second housing part of the air filter box with a rotatable mounting. Thus, a first rotatable mounting may mount the air filter box to the intake manifold and a second rotatable mounting may mount the intake air channel to the air filter box. The first rotatable mounting is configured to rotate in a first direction about the axis of rotation and the second rotatable mounting is configured to rotate in a second direction, opposite the first direction, about the axis of rotation. By doing this, contact between the air filter box and/or the intake air channel and the fuel rail may be limited and/or blocked without increasing a packaging size of the intake apparatus.

Both embodiments of the intake air channel 34 are based on the same manner of functioning that has been schematically illustrated in FIG. 9 for the case of a frontal deformation event. Upon the onset of the frontal deformation event, the horizontally directed force 46 generated by the impact acts firstly on that end region of the intake air channel 34 which is averted from the housing 14. Owing to the relatively lower mechanical strength of the downwardly pointing coherent section 38 of the intake air channel 34, a buckling of the section 38 of the intake air channel 34 with the relatively low mechanical strength occurs in the event of an increase of the force 46 above the predetermined value. As a result, a torque is generated which engages on the air filter box 12 and which is directed such that, if the predetermined value for the force 46 is exceeded, the pivoting movement 32 of the air filter box 12 about the axis of rotation 30 is initiated.

In this way, an air filter box is coupled to an intake manifold via a rotatable bearing. The air filter box may not be displaced toward a fuel rail as it is mounted, via the rotatable bearing, to a structurally rigid portion of the intake manifold, resulting in the impact force pushing the air filter box about an axis of rotation. The technical effect of the rotatable bearing is to provide a greater amount of moveable space to the air filter box without increasing a packaging size of the air filter box or the air intake apparatus.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
an air intake apparatus comprising an intake manifold and an air filter box, wherein the air filter box is mounted to the intake manifold via a rotatable bearing configured to rotate the air filter box about an axis of rotation angled to a forward direction of vehicle travel.

2. The system of claim 1, wherein the intake manifold comprises a first rigid portion and a second deformable portion, wherein a rigidity of the first rigid portion is greater than a rigidity of the second deformable portion, and wherein the rotatable bearing is physically coupled to the first rigid portion of the intake manifold.

3. The system of claim 2, wherein the air filter box comprises a first rigid portion and a second deformable portion, wherein the rigidity of the first rigid portion is greater than a rigidity of the second deformable portion, and wherein the rotatable bearing is physically coupled to the first rigid portion of the air filter box.

4. The system of claim 3, wherein the second deformable portion of the intake manifold and the air filter box face a direction parallel to a direction of forward vehicle travel, and wherein the first rigid portion of the intake manifold and the air filter box face a direction opposite the direction of forward vehicle travel.

5. The system of claim 1, wherein the axis of rotation is normal to the direction of forward vehicle travel.

6. The system of claim 1, wherein the air filter box rotates in a first direction in response to a force exceeding a predetermined force, wherein the force and the first direction are opposite the direction of forward vehicle travel.

7. The system of claim 1, wherein the rotatable bearing comprises a stop element configured to engage with a component to stop a rotation of the air filter box.

8. The system of claim 7, wherein the component is an engine head.

9. An engine system, comprising:
an engine;
an intake manifold; and
an air filter box rotatably coupled to the intake manifold via a rotatable bearing, wherein the rotatable bearing comprises a stop element configured to contact an engine head of the engine during a rotation of the air filter box.

10. The engine system of claim 9, wherein the air filter box comprises a deformable portion and a rigid portion, wherein the deformable portion is configured to compress in response to a force greater than a threshold force, and wherein the force causes the air filter box to rotate.

11. The engine system of claim 9, wherein the stop element contacts the engine head following a threshold rotation of the air filter box, wherein the threshold rotation is less than 90 degrees about an axis of rotation.

12. The engine system of claim 11, wherein the axis of rotation is normal to a forward direction of vehicle travel, and wherein the threshold rotation is less than 45 degrees.

13. The engine system of claim 9, wherein portions of the air filter box and the intake manifold facing a direction of forward vehicle travel are configured to deform in response to a force greater than a threshold force, and wherein portions of the air filter box and the intake manifold to which the rotatable bearing is coupled are configured not to deform in response to the force greater than the threshold force.

14. The engine system of claim 9, wherein the rotatable bearing is a first rotatable bearing, and wherein an air duct is coupled to the air filter box via a second rotatable bearing.

15. The engine system of claim 14, wherein a portion of the air duct proximal to the second rotatable bearing is configured to deform in response to a force greater than a threshold force, and wherein the first rotatable bearing is configured to rotate the air filter box about a first axis of rotation in a first direction, and wherein the second rotatable bearing is configured to rotate the air duct about a second axis of rotation in a second direction, opposite the first direction.

16. A system, comprising:
an engine;
an intake manifold;
an air filter box rotatably coupled to the intake manifold via a first rotatable bearing, wherein the first rotatable bearing comprises a stop element configured to contact an engine head of the engine during a rotation of the air filter box; and
an air duct rotatably coupled to the air filter box via a second rotatable bearing at a portion of the air filter box distal to the first rotatable bearing, wherein the first rotatable bearing is configured to rotate the air filter box in a first direction, and wherein the second rotatable bearing is configured to rotate the air duct in a second direction, opposite the first direction.

17. The system of claim 16, wherein one or more of the air filter box and the air duct comprise a deformable section that comprises a lower structural rigidity that a remainder of the air filter box or the air duct.

18. The system of claim 16, wherein the air duct is arranged in front of the air filter box relative to a direction of forward vehicle travel.

19. The system of claim 16, wherein the air filter box and the air duct are configured to rotate in response to a force exceeding a threshold force, wherein the force is applied in a direction opposite a direction of forward vehicle travel.

* * * * *